(12) United States Patent
Connell et al.

(10) Patent No.: US 9,086,091 B2
(45) Date of Patent: Jul. 21, 2015

(54) BEARING ASSEMBLY FOR ROCK DRILL

(71) Applicant: Caterpillar Global Mining Equipment LLC, Denison, TX (US)

(72) Inventors: Stuart A. Connell, Sherman, TX (US); Larry W. McClure, Sherman, TX (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 0 days.

(21) Appl. No.: 13/924,169

(22) Filed: Jun. 21, 2013

(65) Prior Publication Data

US 2014/0376847 A1 Dec. 25, 2014

(51) Int. Cl.
F16C 29/02 (2006.01)
F16C 31/02 (2006.01)
F16C 35/02 (2006.01)

(52) U.S. Cl.
CPC .............. *F16C 31/02* (2013.01); *F16C 35/02* (2013.01); *F16C 2352/00* (2013.01)

(58) Field of Classification Search
CPC ....... F06C 31/02; F06C 35/02; F06C 2352/00
USPC ......... 384/26, 31, 92, 95, 226, 227, 295, 296, 384/906; 175/359, 367, 371; 173/91, 104, 173/132, 213; 279/19, 19.6, 19.7
See application file for complete search history.

(56) References Cited

U.S. PATENT DOCUMENTS

| | | | | |
|---|---|---|---|---|
| 981,899 A * | 1/1911 | Taylor | ............ | 279/19 |
| 1,999,662 A * | 4/1935 | Nell | ............ | 279/19.3 |
| 2,307,507 A * | 1/1943 | Hutton | ............ | 403/334 |
| 2,348,293 A * | 5/1944 | Hamer | ............ | 384/295 |
| 2,477,054 A * | 7/1949 | Gartin | ............ | 279/19.3 |
| 2,479,698 A * | 8/1949 | Paquin | ............ | 173/133 |
| 3,424,065 A * | 1/1969 | Kurt et al. | ............ | 384/31 |
| 2005/0236836 A1 | 10/2005 | Williams | | |
| 2006/0006602 A1 | 1/2006 | Roddis | | |
| 2007/0289780 A1 | 12/2007 | Osborne | | |
| 2013/0145621 A1 | 6/2013 | Rode | | |

FOREIGN PATENT DOCUMENTS

EP 1734272 12/2006

\* cited by examiner

*Primary Examiner* — James Pilkington
(74) *Attorney, Agent, or Firm* — Foley & Lardner LLP

(57) ABSTRACT

A bearing assembly for a rock drill includes a housing and a bearing. The housing includes a cylindrical tail portion and a head portion having a multi-sided outer surface configured to inhibit a rotation of the bearing assembly relative to the rock drill. The bearing is positioned within the housing and configured to receive a rotatable component of the rock drill.

19 Claims, 14 Drawing Sheets

BEARING ASSEMBLY FOR ROCK DRILL

TECHNICAL FIELD

This disclosure relates to bearings for large machinery, and particularly to a bearing assembly for a rock drill.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Rock drills are typically used to penetrate rock or another surface (i.e., the drilling surface), often as part of a mining operation. These rock drills typically include a drill tool positioned on the end of a drill shank for cutting into the drilling surface. While drilling, the rock drill applies a percussive or oscillating force to the drill tool, driving the drill tool into the drilling surface. At the same time, the rock drill applies a rotative force to the drill shank and drill tool (i.e., sometimes as part of a drill string) in order to send flushing media to the drill tool, and/or to flush rock or other debris away from the drilling surface.

Typically, rock drills include a drill shank bearing or bushing in order to house the drill shank and constrain or control a movement of the drill shank as the drill shank rotates and/or oscillates. During the drilling operation, the drill shank and the drill shank bearing may be subjected to heavy wear due to rock, dirt, sand, water, and other materials flowing along the surface of the components. In addition, as the drill shank rotates and/or oscillates, the drill shank bearing may rotate or otherwise move within the rock drill, creating a friction with the rock drill components and causing further wear to the drill shank bearing. As a result, the drill shank bearing becomes worn relatively quickly and must be changed frequently, which leads to downtime for the rock drill.

Typical drill shank bearings have a rounded shape, similar to the shape of the drill shank. The rounded shape allows the drill shank bearing to move relative to the rock drill as the drill shank rotates and/or oscillates, resulting in further wear to the drill shank bearing and requiring more frequent replacement. Also, in order to replace a typical drill shank bearing, the rock drill must be substantially disassembled. The typical drill shank bearing is pressed into a relatively heavy housing cover, which must be removed and transported to a press in order to replace the drill shank bearing. In a typical replacement operation, the worn drill shank bearing with the rounded shape must be pressed out of the housing cover, a new drill shank bearing must be pressed back into the housing cover, and the housing cover must be transported back to the rock drill for re-assembly.

SUMMARY

An embodiment of the present disclosure relates to a bearing assembly for a rock drill. The bearing assembly includes a housing and a bearing. The housing includes a cylindrical tail portion and a head portion having a multi-sided outer surface configured to inhibit a rotation of the bearing assembly relative to the rock drill. The bearing is positioned within the housing and configured to receive a rotatable component of the rock drill.

Another embodiment of the present disclosure relates to a bearing assembly. The bearing assembly includes a housing and a bearing. The housing includes a tail portion and a head portion having a tricoloid outer surface configured to inhibit a rotation of the bearing assembly. The bearing is positioned within the housing and configured to receive a rotatable component.

Another embodiment of the present disclosure relates to a shank bearing assembly for a rock drill. The shank bearing assembly includes a shank housing and a shank bearing. The shank housing includes a cylindrical tail portion, and a head portion having a cylindrical opening and a tricoloid shaped outer surface configured to inhibit a rotation of the shank bearing assembly relative to the rock drill. The head portion also includes three retaining slots configured to mate with one or more retaining components of the rock drill to inhibit an axial movement of the shank housing. The shank bearing is positioned within the shank housing and configured to receive a rotatable drill shank.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
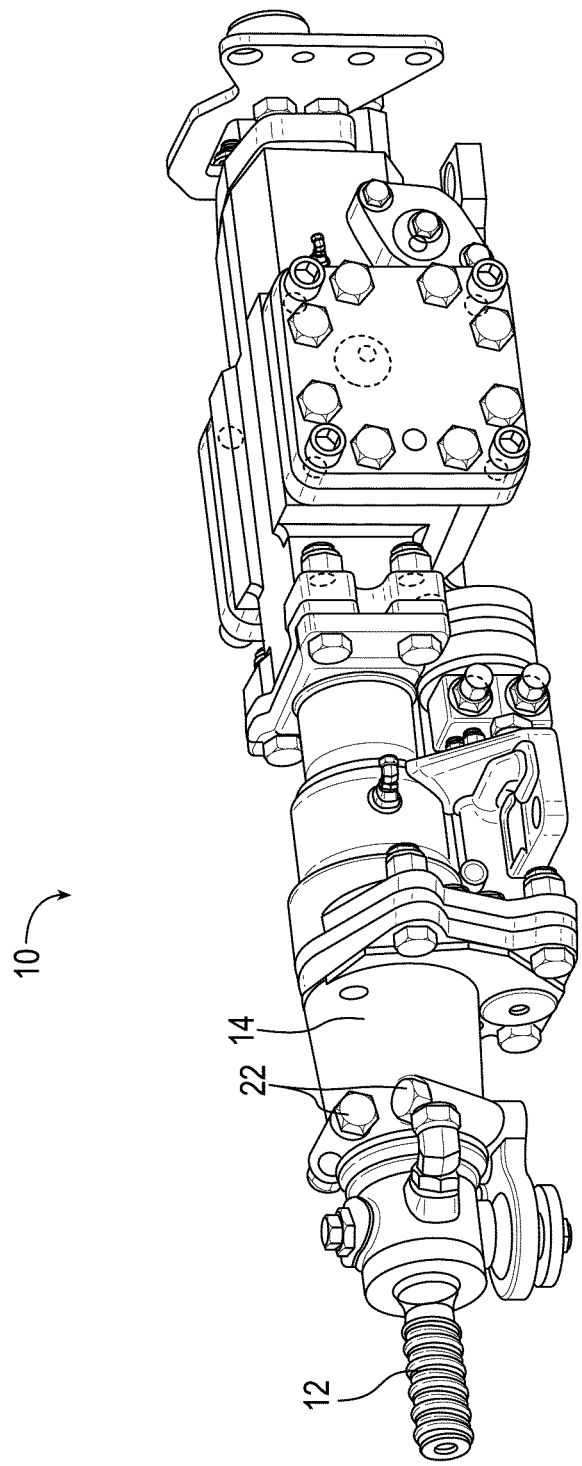
FIG. 1 is a perspective view of a rock drill, according to an exemplary embodiment.
Figure 2:
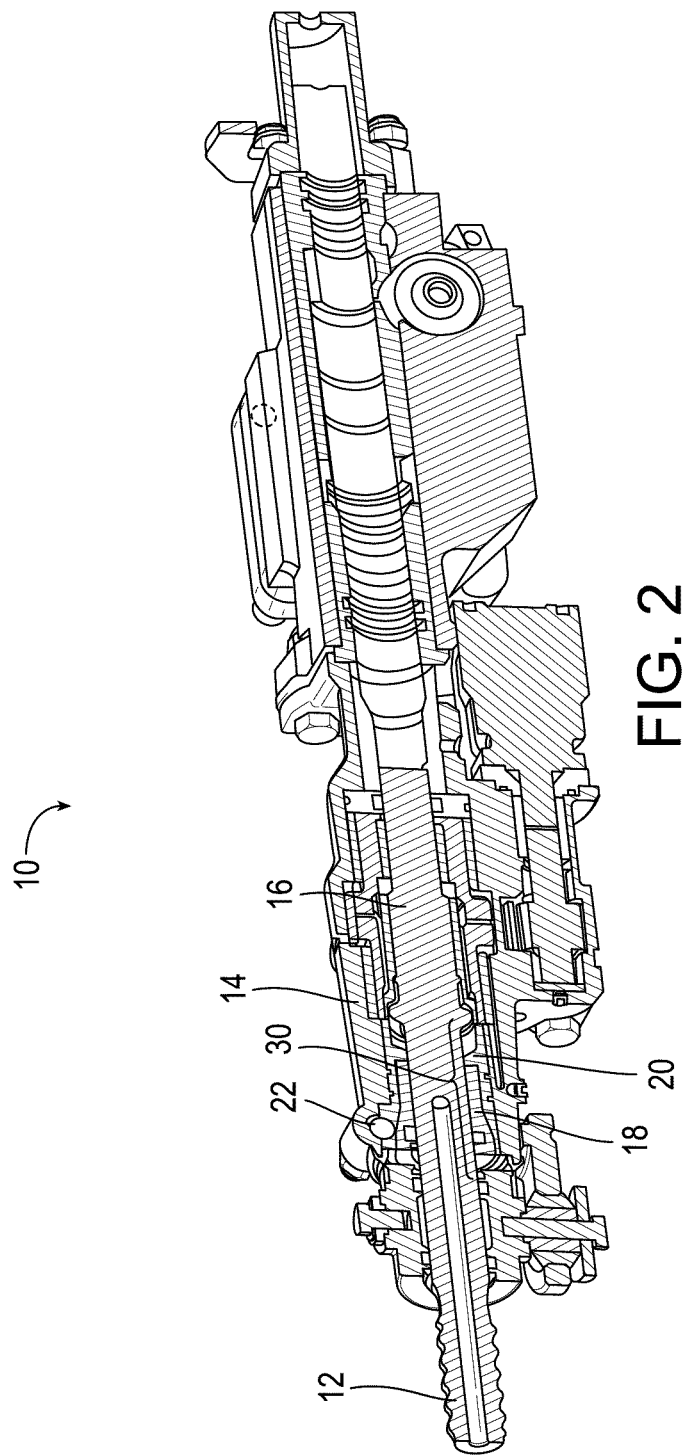
FIG. 2 is a cross-sectional view of the rock drill taken along line 2-2 of FIG. 1.
Figure 3:
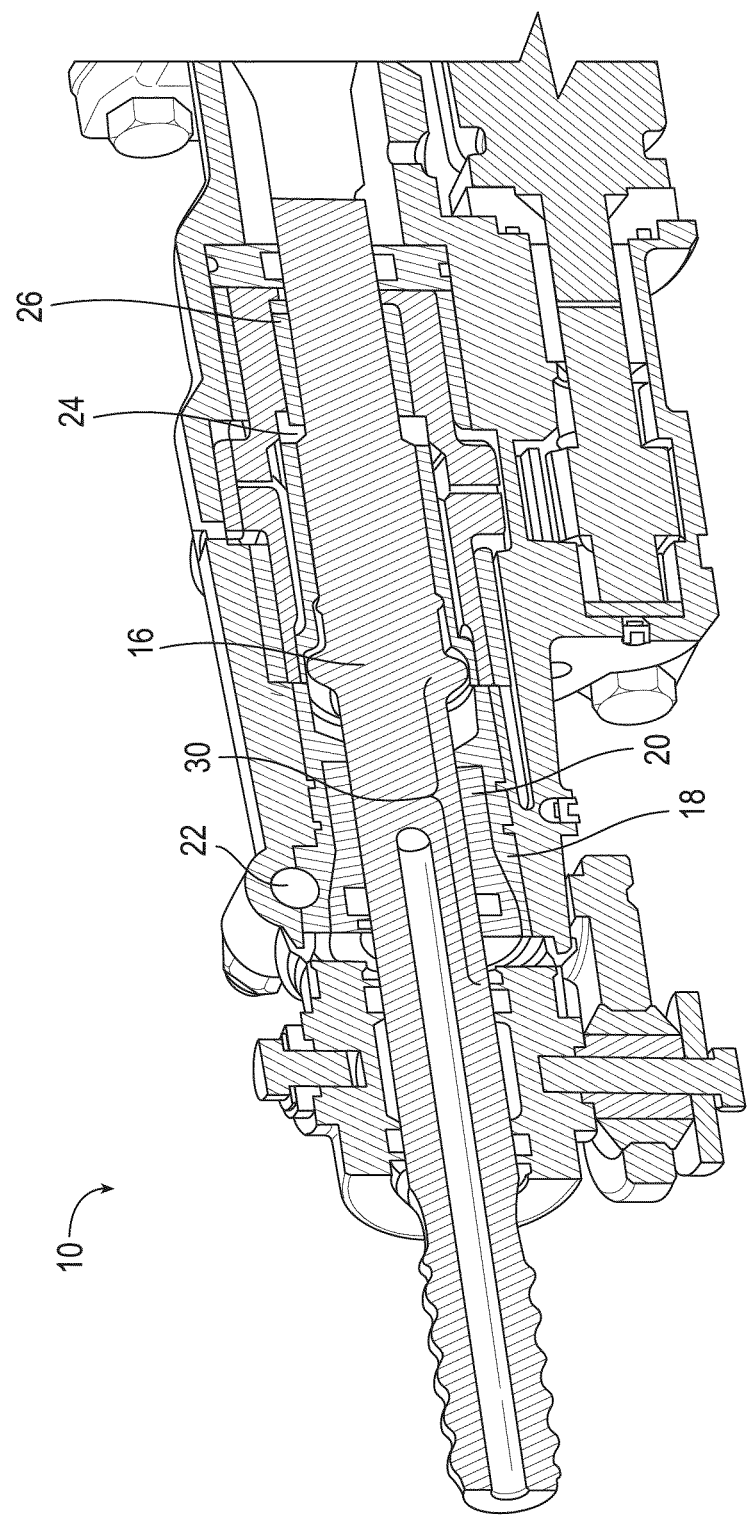
FIG. 3 is a detail view of a portion of the rock drill of FIG. 2.

Referring to FIGS. 1-3, a rock drill 10 (i.e., device) is shown according to an exemplary embodiment. The rock drill 10 includes a drill tool 12 (i.e., hammer, chisel, cutting surface, bit, etc.) positioned at the end of a drill shank 16 (i.e., rotatable drill shank) and configured to strike rock or another surface (i.e., the drilling surface) in order to drill a hole into the drilling surface. In an exemplary embodiment, the rock drill 10 includes a percussive system configured to oscillate or otherwise drive the drill shank 16 and the drill tool 12 in an axial motion (i.e., a longitudinal motion between two points along the axis of the drill shank 16, to the left and to the right according to FIGS. 1-3), causing the drill tool 12 to strike the drilling surface. The rock drill 10 also includes a rotative system configured to axially rotate the drill shank 16 (and thus the drill tool 12) and/or a drill string (not shown) surrounding the drill shank 16, such as to send flushing media to the drill tool 12, flushing rock, mud or other debris out of the annulus of the drilled hole.

The rock drill 10 may also include one or more components configured to enable the axial rotation of the drill shank 16 and/or to inhibit or limit the axial motion of the drill shank 16 (i.e., the longitudinal motion along the axis of the drill shank 16) as the rock drill 10 performs a drilling operation. According to the illustrated embodiment of FIGS. 1-3, the rock drill 10 includes a rear shank bushing 26 (shown in FIG. 3) configured to provide a housing or bearing surface for a rear portion of the drill shank 16, enabling the axial rotation of the drill shank 16. The rock drill 10 also includes a rear shank seat 24 for constraining or inhibiting the axial motion of a rear portion of the drill shank 16, substantially preventing an unwanted axial or linear movement of the drill shank 16 as the drill shank 16 moves within the rock drill 10. A bearing assembly 30 (shown in FIG. 2) is positioned at a front portion of the rock drill 10 and is intended to perform a function similar to the collective function of the rear shank bushing 26 and the rear shank seat 24. The bearing assembly 30 (i.e., shank bearing assembly) houses a front portion of the drill shank 16 in order to enable an axial rotation of the drill shank 16 and to inhibit or limit an axial motion of the front portion of the drill shank 16 as the rock drill 10 performs its drilling operation.

The bearing assembly 30 is positioned substantially within a rotation housing cover 14 of the rock drill 10. The bearing assembly 30 includes a shank bearing 18 (e.g., chuck, bearing, or front shank bearing) configured to receive the drill shank 16 and to enable the axial rotation of the drill shank 16 during the drilling operation. The shank bearing 18 may also constrain a relative radial or linear motion of the drill shank 16 in order to prevent an unwanted movement of the drill shank 16, such as when the drill tool 12 or drill shank 16 drifts from the drilling surface and out of line with the rotation axis of the rock drill 10. In an exemplary embodiment, the shank bearing 18 is sized and shaped such that the drill shank 16 (or a portion of the drill shank 16) fits securely (i.e., tightly or snugly) within the shank bearing 18, but is able to rotate and/or oscillate as necessary in order to perform the drilling operation. In other embodiments, the shank bearing 18 may be otherwise sized and shaped as may be suitable for the particular application of the bearing assembly 30.

The bearing assembly 30 also includes a housing 20 (e.g., bearing housing, seat, front shank seat, shank housing, etc.) configured to house or retain the shank bearing 18, such that the shank bearing 18 is positioned within the housing 20. The shank bearing 18 is removable and replaceable from the housing 20 and from the bearing assembly 30. The housing includes one or more retaining slots 32 (shown more particularly in FIG. 4) for inhibiting the axial (i.e. longitudinal) motion (i.e., movement) of the drill shank 16. The retaining slots 32 (i.e., retaining features) are configured to mate with one or more retaining rods 22 (i.e., retaining components) (e.g., bolts, screws, pins, etc.) in the illustrated embodiment of FIGS. 1-3, but the retaining slots 32 are also configured to mate with a ring or other similar attachment or component in other embodiments in order to inhibit (i.e., constrain) the axial motion of the bearing assembly 30. In an exemplary embodiment, the retaining rods 22 are substantially cylindrical. In order to remove the bearing assembly 30, such as to remove and/or replace the housing 20 or the shank bearing 18, the retaining rods 22 are removed. Once the retaining rods 22 are removed, the bearing assembly 30 is configured to axially slide or pull out from the rock drill 10 for replacement. In an exemplary embodiment, the shank bearing 18 and the housing 20 are sized and shaped such that the shank bearing 18 fits securely within the housing 20, but the shank bearing 18 and housing 20 may be sized and/or shaped as is otherwise necessary or desirable in other embodiments. For instance, the housing 20 may also be sized and/or shaped to mate with the retaining rod 22 in order to inhibit a motion of the housing 20 and/or the bearing assembly 30. The bearing assembly 30 and its components are shown more particularly in FIGS. 4-14, and described in further detail and according to one or more exemplary embodiments below.

Figure 4:
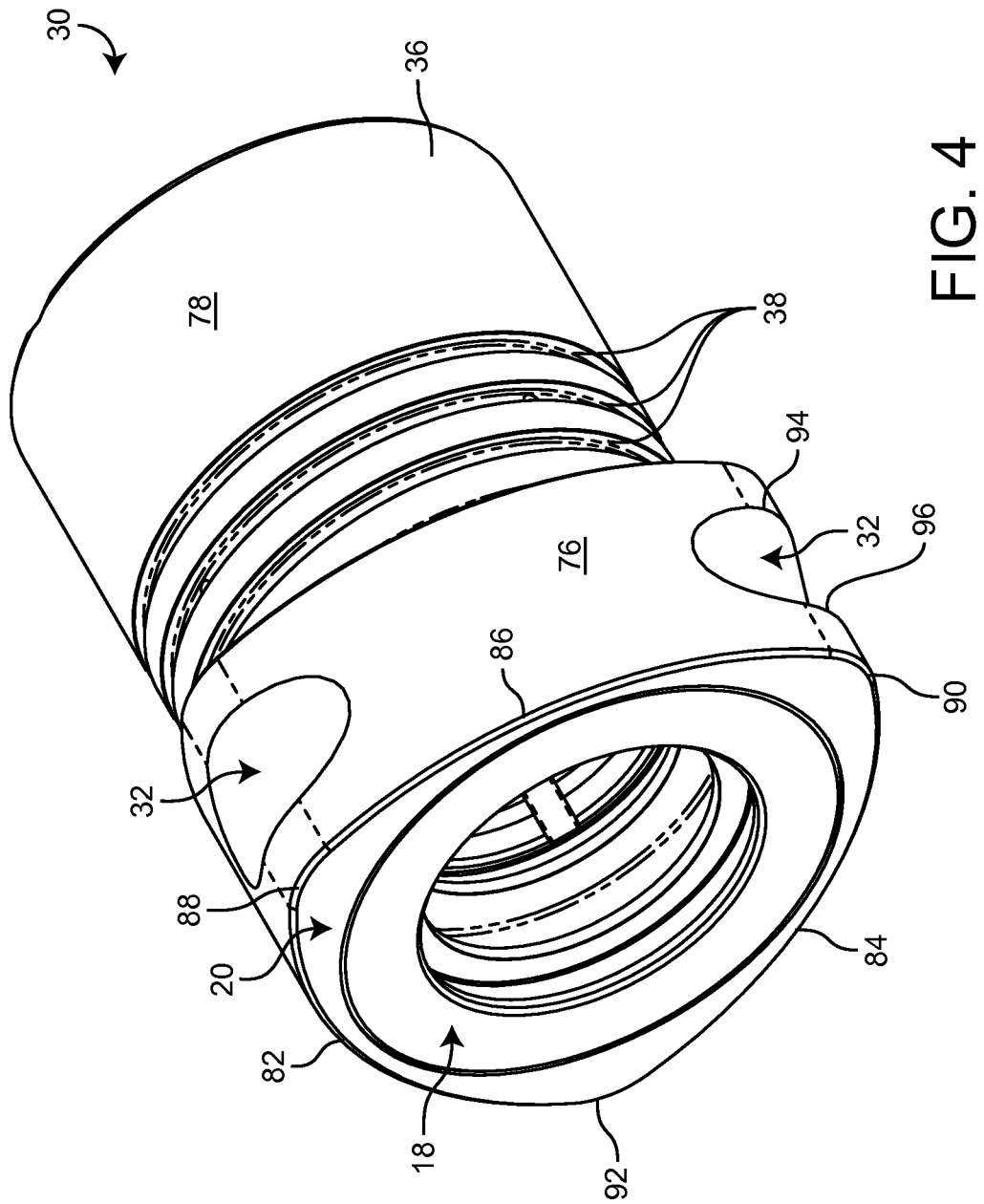
FIG. 4 is a perspective view of a bearing assembly of the present disclosure, according to an exemplary embodiment.
Figure 5:
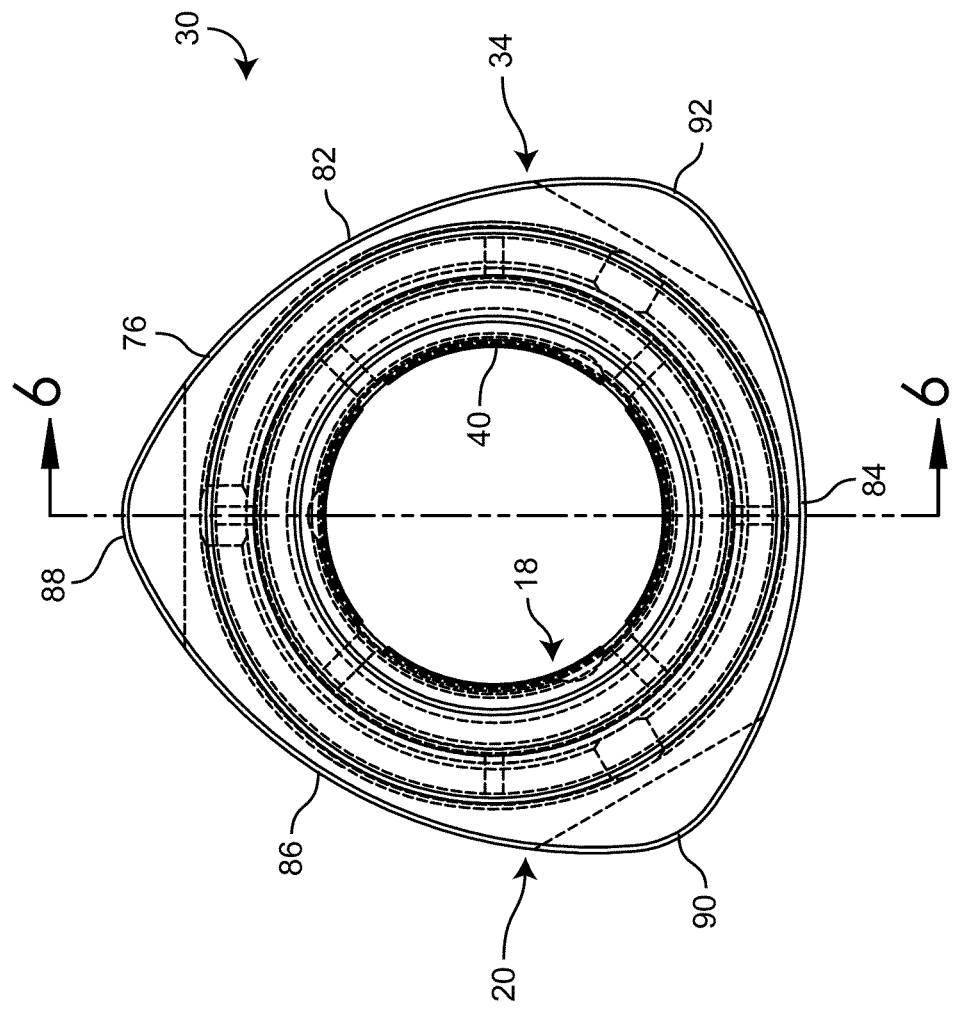
FIG. 5 is a rear elevation view of the bearing assembly of FIG. 4.
Figure 6:
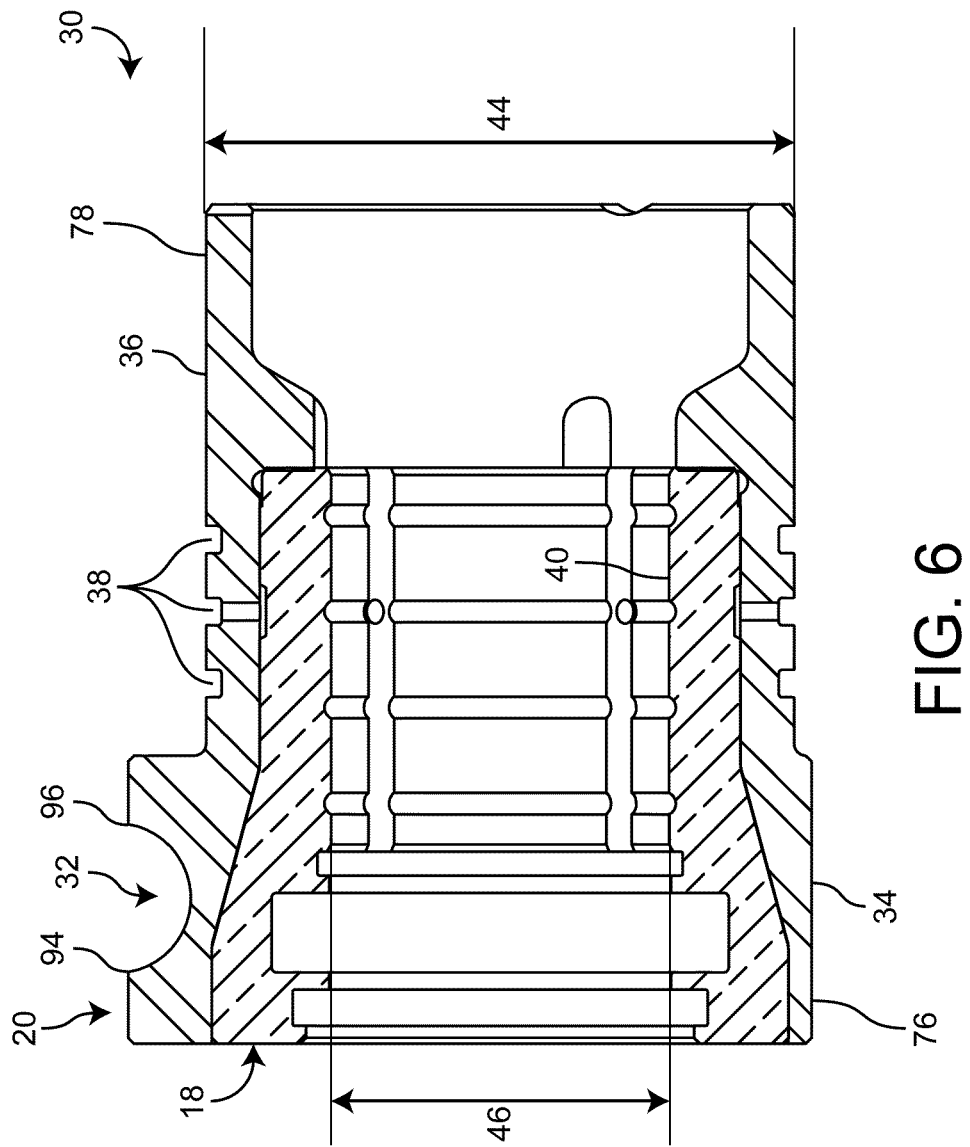
FIG. 6 is a cross-sectional view of the bearing assembly taken along line 6-6 of FIG. 5.
Figure 7:
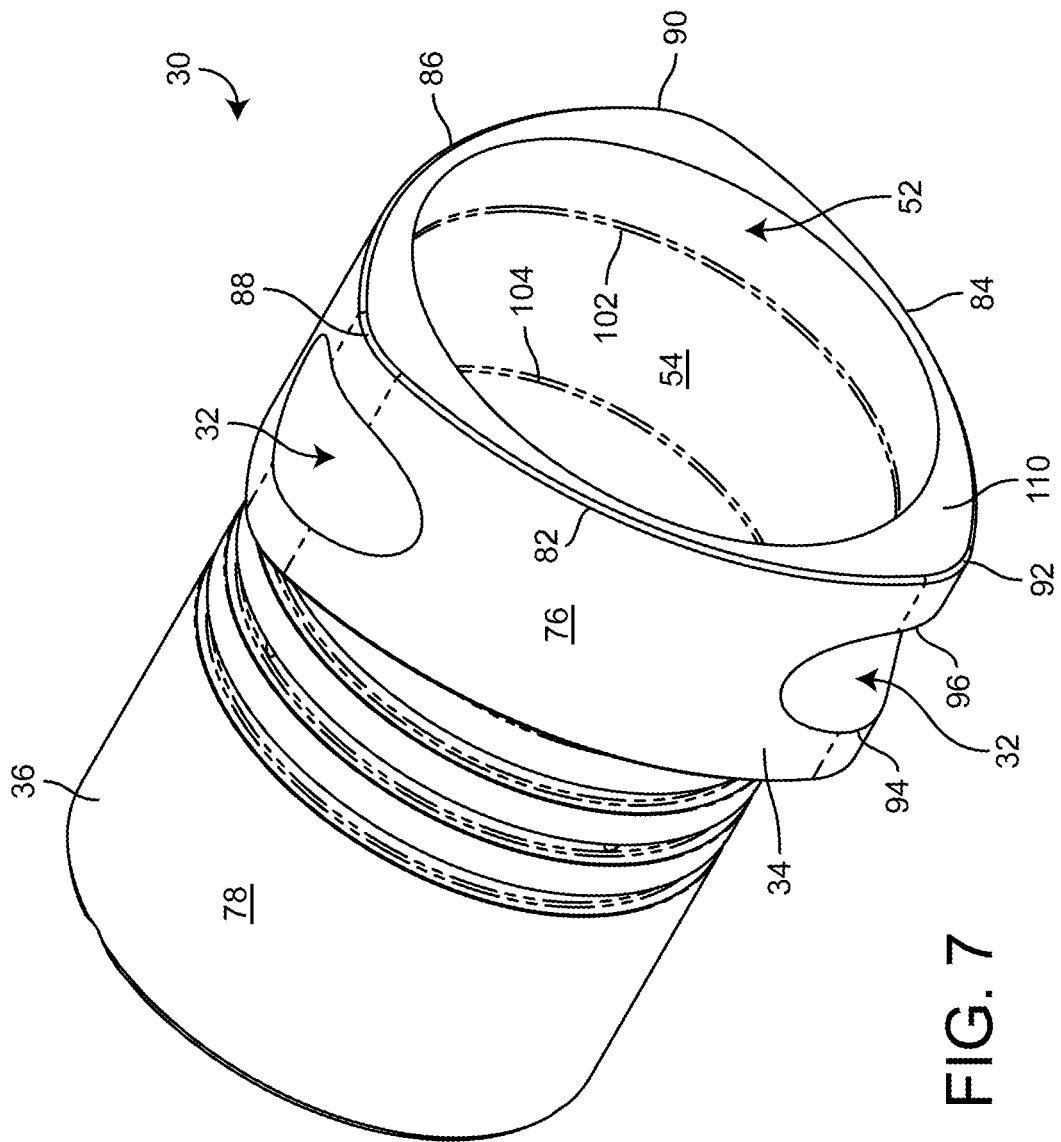
FIG. 7 is a perspective view of a housing for the bearing assembly of FIG. 4, according to an exemplary embodiment.
Figure 8:
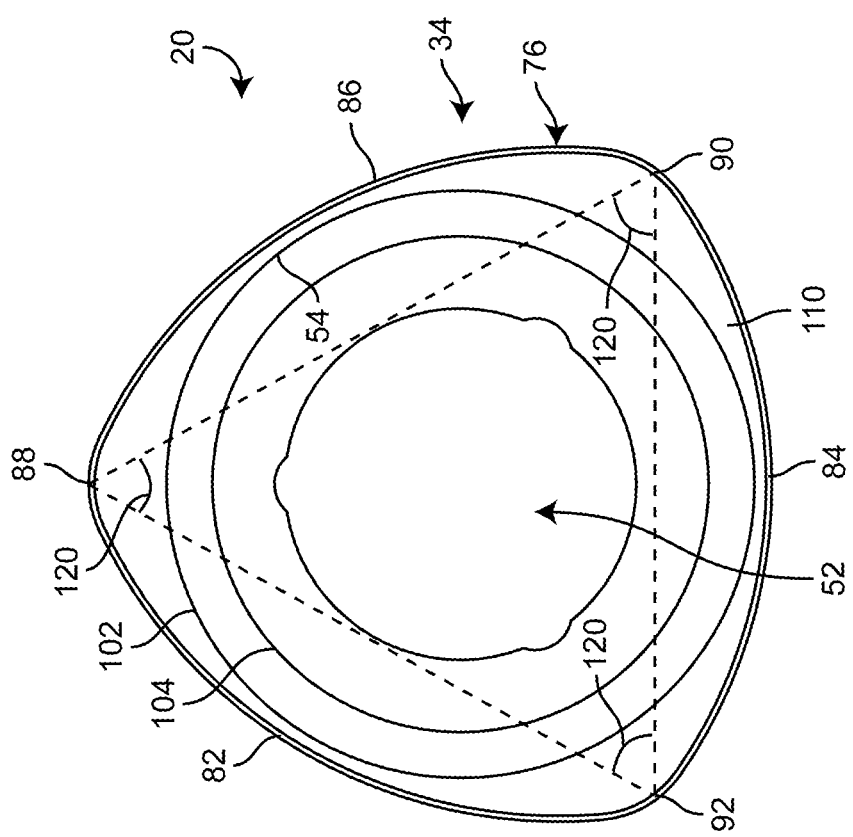
FIG. 8 is a front elevation view of the housing of FIG. 7.

Referring now to FIGS. 4-6, the bearing assembly 30 is shown according to an exemplary embodiment. In this embodiment, the shank bearing 18 is positioned within the housing 20 such that the shank bearing 18 is internal to the housing 20. The housing 20 includes a multi-sided head portion 34 connected to a cylindrical tail portion 36. The head portion 34 includes a multi-sided outer surface 76 configured to inhibit an axial movement or rotation of the bearing assembly 30 relative to the rock drill 10. In the illustrated embodiment of FIGS. 4-6, the head portion 34 and the outer surface 76 have a substantially tricoloidal (i.e., triangular, three-sided, or tricoloid), shape, with the outer surface 76 having three sides 82, 84, and 86 meeting at three contact points 88, 90, and 92. In this embodiment, the rock drill 10 (i.e., the rotation housing cover 14) is similarly sized and shaped so that the bearing assembly 30 (i.e., the housing 20) fits securely within the rotation housing cover 14. For instance, in one embodiment the rotation housing cover 14 includes a multi-sided inner surface (not shown) configured to mate with the outer surface 76 of the housing 20 to substantially prevent or inhibit the rotation of the housing 20. The sides 82, 84, and 86 and the contact points 88, 90, and 92 are thus configured to abut with one or more surfaces of the rotation housing cover 14 when the drill shank 16 rotates and/or oscillates, substantially preventing or inhibiting the bearing assembly 30 and the housing 20 from rotating (axially or otherwise) relative to the rock drill 10. By preventing or inhibiting the bearing assembly 30 from rotating relative to the rock drill 10, the multi-sided head portion 34 is intended to reduce the load (i.e., the force) applied to the bearing assembly 30, perhaps reducing the amount of wear applied to the bearing assembly 30. In other embodiments, the head portion 34 may have another shape (e.g., square, octagonal, hexagonal, etc.) and/or a greater or lesser number of sides in order to prevent or inhibit rotation of the bearing assembly 30 relative to the rock drill 10. The housing 20, sides 82, 84, and 86, and contact points 88, 90, and 92 are described further in reference to FIGS. 7-11.

Figure 9:
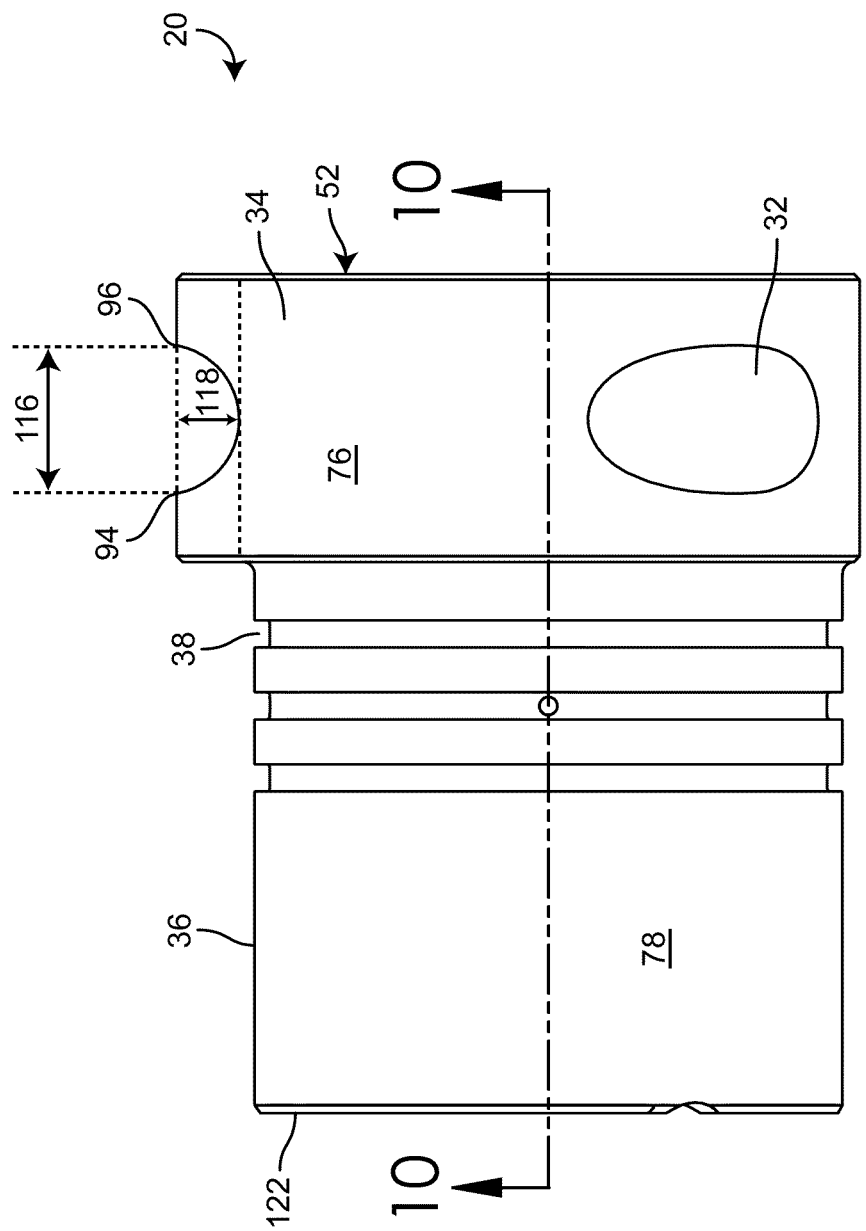
FIG. 9 is a side elevation view of the housing of FIG. 7.

The retaining slots 32 of the head portion 34 are configured to receive retaining rods 22 and/or other retaining features of the rock drill 10. In an exemplary embodiment, the head portion 34 includes three retaining slots 32, with one retaining slot 32 formed adjacent to each of the contact points 88, 90, and 92 (i.e., each contact point 88, 90, and 92 is adjacent to a unique or different retaining slot 32). In this embodiment, the rock drill 10 includes retaining features or components such as retaining rods 22 configured to mate with each of the retaining slots 32 in order to prevent an axial movement or motion of the bearing assembly 30 relative to the rock drill 10. The retaining slots 32 are sloped, with a curvature configured to match the curvature of the retaining rods 22. The retaining slots 32 include walls 94 and 96 on either side of the retaining slots 32 and configured to abut with the retaining rods 22 in order to substantially prevent or inhibit axial movement into or away from the rock drill 10 (i.e., longitudinal along the axis of the bearing assembly 30 and/or the drill shank 16) during operation of the rock drill 10. The retaining rods 22 and retaining slots 32 may be sized and shaped to mate with each other, such that the retaining rods 22 fit within the retaining slots 32. For instance, the width of the retaining slots 32 (i.e., a distance 116 between the wall 94 and the wall 96, as shown in FIG. 9) may correspond to the diameter of the retaining rods 22, such that the retaining slots 32 are sized to fit the diameter of the retaining rods 22. In one embodiment, the distance 116 (i.e., the width of the retaining slots 32) may be approximately equal to the diameter of the retaining rods 22. In an exemplary embodiment, the retaining rods 22 are positioned within the retaining slots 32 such that the center axes of each of the retaining rods 22 are substantially perpendicular to the center axis of the bearing assembly 30 (i.e., the rotational axis of the drill shank 16).

The bearing assembly 30 also includes grooves 38 positioned on the tail portion 36 of the housing 20. In the illustrated embodiment of FIGS. 4-6, the housing 20 includes three grooves 38 formed on the tail portion 36, but the housing 20 may include a lesser or greater number of grooves 38 in other embodiments, as may be suitable for the particular application of the bearing assembly 30. The grooves 38 are recessed from an outer surface 78 of the tail portion 36, having a uniform width and depth around the outer circumference of the tail portion 36. The grooves 38 are similarly shaped in the embodiment of FIGS. 4-6, but may be shaped differently in other embodiments as may be suitable for the particular application. The grooves 38 may be configured to mate with one or more components of the rock drill 10 in order to fit the bearing assembly 30 securely within the rock drill 10, to create a seal between the bearing assembly 30 and the drill shank 16, or for any other purpose as may be suitable for the particular application of the bearing assembly 30. For instance, in one embodiment one or more of the grooves 38 may be mated with an O-ring (not shown), with the O-ring providing a fluid seal against the rotation housing cover 14 when the bearing assembly 30 is positioned within the rock drill 10. One of the grooves 38 may also be used as a lubrication path to provide lubrication to an inner surface 40 of the shank bearing 18 as the drill shank 16 rotates within the shank bearing 18.

Referring to FIG. 6, the bearing assembly 30 has an outer diameter 44 formed by an outer surface 78 of the tail portion 36 of the housing 20. In an exemplary embodiment, the outer diameter 44 is approximately equal to an inner diameter of the rotation housing cover 14, such that the bearing assembly 30 fits securely within the rotation housing cover 14. In an exemplary embodiment, the outer diameter 44 is within a range of approximately 7.747-7.798 centimeters 3.050-3.070 inches), and more particularly may be approximately 7.772 centimeters (3.060inches). The outer diameter 44 may have another length in other embodiments, as may be suitable for the particular application of the bearing assembly 30 and/or the dimensions of the rock drill 10. In the illustrated embodiment of FIGS. 4-6, the tail portion 36 is substantially cylindrical, such that the outer diameter 44 is substantially uniform through the tail portion 36 of the housing 20. The bearing assembly 30 also has an inner diameter 46 formed by the inner surface 40 of the shank bearing 18. In an exemplary embodiment, the inner diameter 46 is approximately equal to an outer diameter of the drill shank 16, such that the drill shank 16 fits within the bearing assembly 30. In an exemplary embodiment, the inner diameter 46 is within a range of approximately 4.445-4.496 centimeters (1.750-1.770 inches), and more particularly may be approximately 4.470 centimeters (1.760 inches). The inner diameter 46 may have another length in other embodiments, as may be suitable for the particular application of the bearing assembly 30 and/or the dimensions of the drill shank 16.

Referring now to FIGS. 7-11, the housing 20 of the bearing assembly 30 is shown, according to an exemplary embodiment. In this embodiment, the housing 20 forms the outer portion of the bearing assembly 30, being sized and shaped to fit securely within the rotation housing cover 14. In an exemplary embodiment, the housing 20 is at least partially made from a strong steel material, such as an alloyed or stainless steel, but the housing 20 may be made from another material in other embodiments. The housing 20 includes an opening 52 for receiving the shank bearing 18. The housing also includes an inner surface 54, which may form the shape of the opening 52. The opening 52 is configured to receive the shank bearing 18, and the inner surface 54 is sized and shaped to fit around the shank bearing 18 as may suitable for the particular application of the bearing assembly 30. The housing 20 also includes a back surface 112 (shown in FIG. 10) configured to provide a stop for the shank bearing 18, such that the shank bearing 18 fits within the housing 20 between the back surface 112 (i.e., back stop) and a flat surface 110 forming a perimeter around the opening 52. The inner surface 54 may include grooves, contours, or other features configured to receive a similarly shaped portion of the shank bearing 18 in order to mate the shank bearing 18 to the housing 20.

The head portion 34 of the housing 20 has a substantially tricoloidal (i.e., three-sided) shape in the illustrated embodiment of FIGS. 7-11, being configured to substantially prevent or inhibit the housing 20 and the bearing assembly 30 from rotating relative to the rock drill 10 (i.e., the rotation housing cover 14) while the rock drill 10 is in use (i.e., as the drill shank 16 oscillates and/or rotates). According to the illustrated embodiment of FIG. 10, the head portion 34 has a length 74 from the surface 110 to the start of the tail portion 36. In an exemplary embodiment, the length 74 of the head portion 34 is within a range of approximately 3.785-3.835centimeters (1.490-1.510 inches), and more particularly may be approximately 3.810 centimeters 1.500 inches). The head portion 34 may be otherwise sized in other embodiments.

The contact points 88, 90, and 92 are configured to abut with one or more surfaces of the rotation housing cover 14 when the rock drill 10 is performing a drilling operation, substantially preventing an axial rotation of the housing 20 and/or the bearing assembly 30 in either direction. As shown in the illustrated embodiment of FIG. 8, a straight line connecting each of the contact points 88, 90, and 92 forms a shape similar to an equilateral triangle, with substantially equal angles 120 formed between each of the contact points 88, 90, and 92. In an exemplary embodiment, the angle 120 between each of the contact points 88, 90, and 92 is approximately 60 degrees. The sides 82, 84, and 86 are rounded in the illustrated embodiment of FIGS. 7-11, forming angles larger than the angle 120 at each of the contact points 88, 90, and 92. The sides 82, 84, and 86 may be rounded or curved in order to allow for a greater machining tolerance of the housing 20 and/or a bearing assembly 30 while still maintaining the non-rotative properties of the housing 20 and/or the bearing assembly 30 within the rotation housing cover 14. The sides 82, 84, and 86 may also be rounded or curved to accommodate the shape of the opening 52, while limiting the amount of material necessary for the housing 20 by reducing the size or surface area of the surface 110. The head portion 34 of the housing 20 is shown to have a tricoloidal shape in this embodiment, but in other embodiments the head portion 34 may have another multi-sided shape configured to substantially prevent or inhibit the housing 20 and the bearing assembly 30 from rotating relative to the rock drill 10 while the rock drill 10 is in use. The head portion 34 may also have a corresponding number of contact points. For instance, the head portion 34 may have a rectangular (i.e., four-sided), hexagonal (i.e., six-sided), or octagonal (i.e., eight-sided) shape in other embodiments, having a corresponding or equal number of sides and contact points in order to substantially prevent or inhibit the rotation of the housing 20 and/or the bearing assembly 30.

The retaining slots 32 of the housing 20 are configured to prevent a movement or motion (e.g., an axial movement) of the housing 20 and/or the bearing assembly 30 when the rock drill 10 is in use (i.e., as the drill shank 16 moves or oscillates away from and into the rock drill 10). The retaining slots 32 are formed on the head portion 34 of the housing 20. In the illustrated embodiment of FIGS. 7-11, the retaining slots 32 are positioned at each of the contact points 88, 90, and 92 of the head portion 34, with one retaining slot 32 being substantially centered on each of the contact points 88, 90, and 92. In other embodiments, the retaining slots 32 may be otherwise positioned on the head portion 34 or in another position on the housing 20 in order to prevent or inhibit axial movement of the housing 20 and/or the bearing assembly 30. The size and shape of the retaining slots 32, including the depth, curvature, length, and/or any other dimension of the retaining slots 32 is configured to match one or more dimensions of the retaining rod 22 (or other applicable retaining feature within the rock drill 10) in order to substantially prevent the housing 20 and bearing assembly 30 from moving axially within the rock drill 10. As shown in FIG. 9, the retaining slots 32 may have a rounded or half-circle shape. In one embodiment, the retaining slots 32 are sized such that a distance 116 (shown in FIG. 9) between the wall 94 and the wall 96 is approximately equal to the diameter or another dimension of the retaining rods 22. In another embodiment, the retaining slots 32 are sized such that the retaining slot 32 has a depth 118 (shown in FIG. 9) that is approximately equal to the diameter or another dimension of the retaining rods 22. The housing 20 and the bearing assembly 30 are configured to remain substantially stationary relative to the rock drill 10 while the rock drill 10 is in use.

Figure 10:
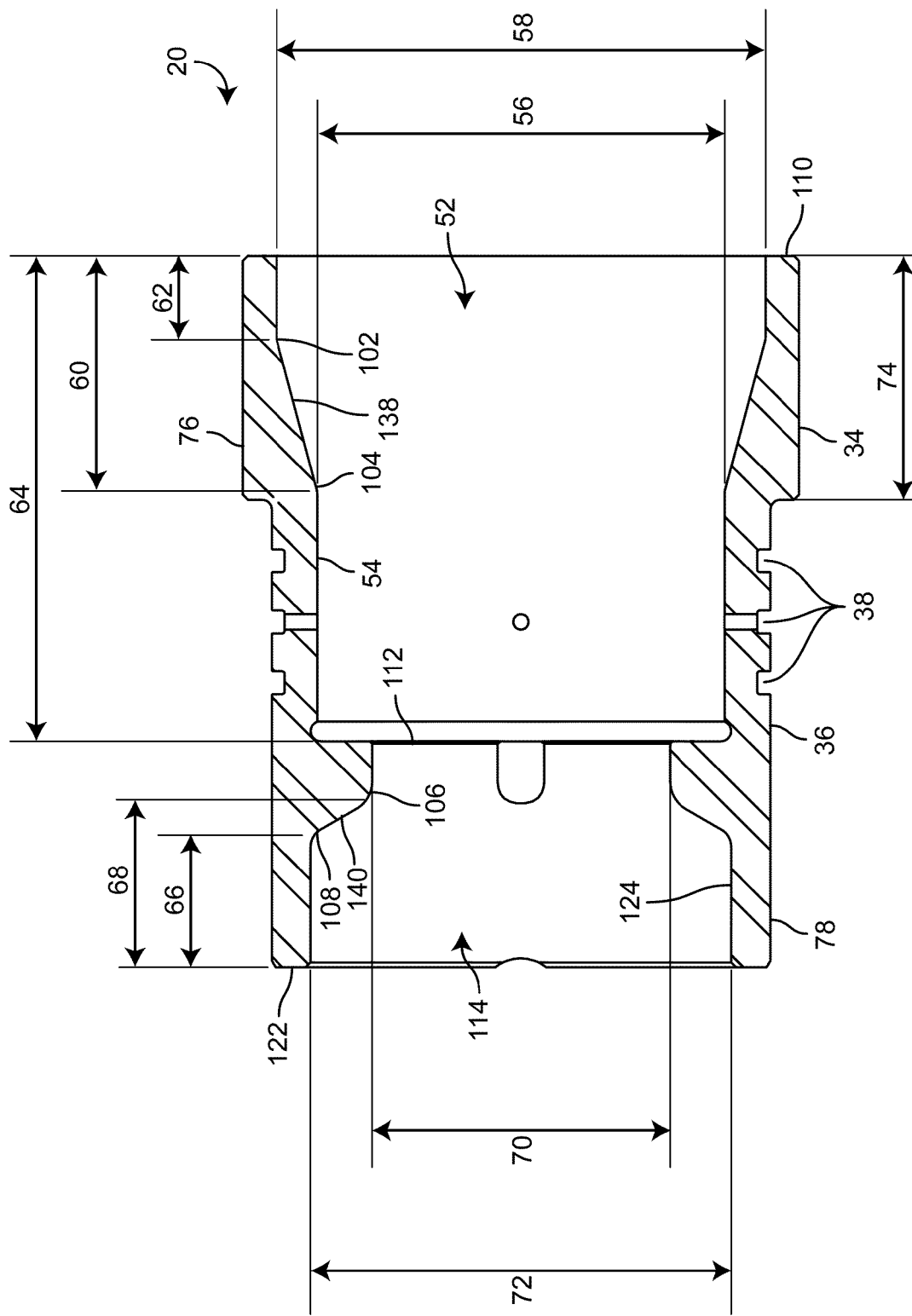
FIG. 10 is a cross-sectional view of the housing taken along line 10-10 of FIG. 9.
Figure 11:
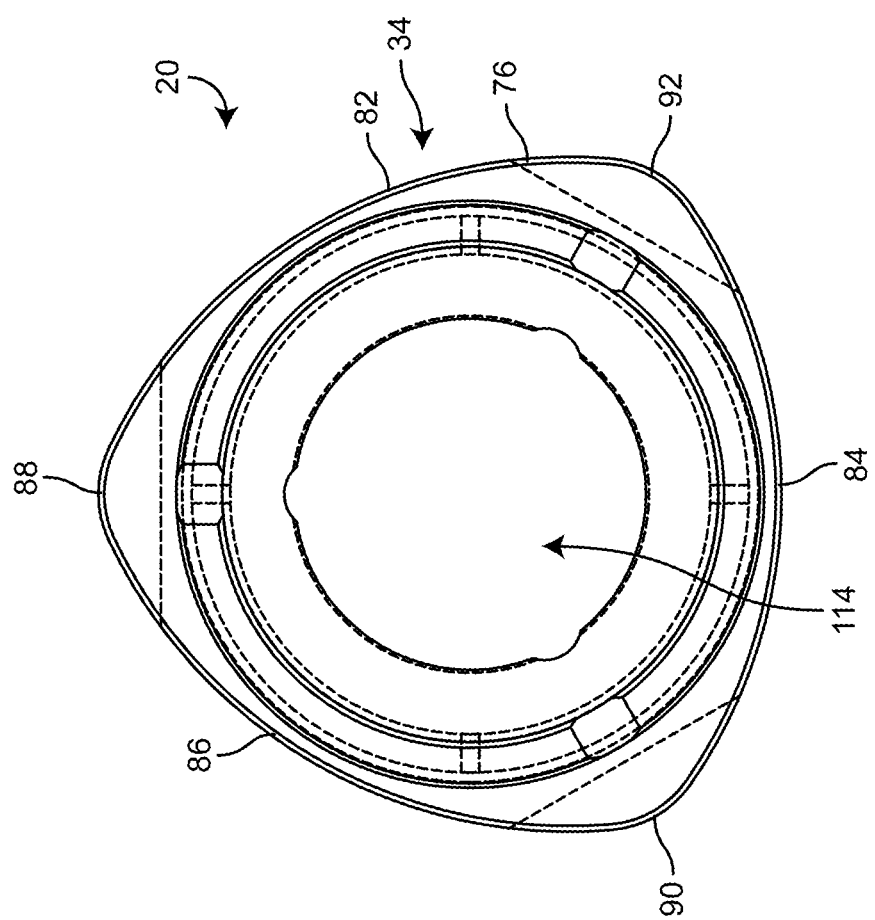
FIG. 11 is a rear elevation view of the housing of FIG. 7.

Referring still to FIGS. 7-11, and specifically to FIG. 10, the housing 20 is sized and shaped to fit securely within the rotation housing cover 14, as well as to receive and retain the shank bearing 18. The housing 20 may then have one or more dimensions specifically configured to mate the housing 20 with the rotation housing cover 14 and/or the shank bearing 18. For instance, the diameter of the opening 52 is variable at different points within the housing 20 in order to accommodate the shank bearing 18. At the flat surface 110, the opening 52 is at its largest, having a diameter 58. In the illustrated embodiment of FIGS. 7-11, the opening 52 is substantially cylindrical such that the diameter 58 of the opening 52 at the surface 110 is substantially uniform. In an exemplary embodiment, the diameter 58 is within a range of approximately 7.595-7.645 centimeters (2.990-3.010 inches), and more particularly may be approximately 7.620 centimeters (3.000 inches). The diameter 58 may also have another length in other embodiments.

Moving from the surface 110 inward and toward the back surface 112 of the housing 20 (right to left according to FIG. 10), the opening 52 maintains the diameter 58 up to a tapered bore section 138 (i.e., gradient or angled surface) on the inner surface 54 (i.e., for a distance 62 from the surface 110 to the tapered bore section 138). In an exemplary embodiment, the tapered bore section 138 is sized and shaped to match one or more features of the shank bearing 18 (e.g., contour 126, contour 128, etc.), and/or to mate the housing 20 with the shank bearing 18. The tapered bore section 138 is formed between gradient 102 and gradient 104, both positioned on the inner surface 54. In an exemplary embodiment, the distance 62 between the surface 110 and the tapered bore section 138 is within a range of approximately 1.283-1.334 centimeters (0.505-0.525inches), and more particularly may be approximately 1.308 centimeters (0.515 inches). The distance 62 may have another length in other embodiments, as may be suitable for the particular application of the housing 20. Through the tapered bore section 138, the inner surface 54 slants toward a center axis of the housing 20, decreasing the diameter of the opening 52 until reaching the gradient 104 on the inner surface 54. The gradient 104 is positioned a distance 60 from the surface 110, as measured along the outer surface 76 of the head portion 34. In an exemplary embodiment, the distance 60 is within a range of approximately 3.653-3.703centimeters (1.438-1.458 inches), and more particularly may be approximately 3.678 centimeters 1.448 inches). The distance 60 may have another length in other embodiments, as may be suitable for the particular application of the housing 20. From the gradient 104 to the back surface 112 (right to left according to FIG. 10), the opening 52 has a substantially uniform diameter 56 across its substantially uniform cylindrical shape. In an exemplary embodiment, the diameter 56 is within a range of approximately 6.325-6.375 centimeters (2.490-2.510 inches), and more particularly may be approximately 6.350 centimeters (2.500 inches). The diameter 56 may have another length in other embodiments, as may be suitable for the particular application of the housing 20. The back surface 112 is positioned a distance 64 from the surface 110. In an exemplary embodiment, the distance 64 is within a range of approximately 7.554-7.605centimeters (2.974-2.994 inches), and more particularly may be approximately 7.579 centimeters 2.984 inches). The distance 64 may have another length in other embodiments, as may be suitable for the particular application of the housing 20 and/or the dimensions of the shank bearing 18.

Still referring to FIG. 10, the housing 20 also includes an opening 114 configured to mate directly with the drill shank 16. The opening 114 may be sized and shaped to receive the drill shank 16 such that the drill shank 16 fits securely within the opening 114 and the housing 20. The opening 114 extends from a surface 122 of the housing 20 surrounding the opening 114 to the back surface 112 within the housing 20. The diameter of the opening 114 (i.e., the diameter of an inner surface 124 of the housing 20) is variable within the housing 20 in order to accommodate the drill shank 16. At the surface 122, the opening 114 has a diameter 72. In an exemplary embodiment, the diameter 72 is within a range of approximately 6.535-6.586centimeters (2.573-2.593 inches), and more particularly may be approximately 6.561 centimeters 2.583 inches). The diameter 72 may have a different length in other embodiments as may be suitable for the particular application of the housing 20 and/or the dimensions of the drill shank 16.

Moving further within the opening 114 and away from the surface 122 (left to right according to FIG. 10), the opening 114 maintains the diameter 72 up to a tapered bore section 140 on the inner surface 124. The tapered bore section 140 is formed between gradient 108 and gradient 106, both positioned on the inner surface 124. The tapered bore section 140 is positioned a distance 66 away from the surface 122 on the inner surface 124. In an exemplary embodiment, the distance 66 is within a range of approximately 2.032-2.083 centimeters (0.800-0.820inches), and more particularly may be approximately 2.057 centimeters (0.810 inches). The distance 66 may have another length in other embodiments, as may be suitable for the particular application of the housing 20. Through the tapered bore section 140, the inner surface 124 slants toward a center axis of the housing 20, decreasing the diameter of the opening 114 until reaching the gradient 106 on the inner surface 124. The gradient 106 is positioned a distance 68 from the surface 122, as measured along the outer surface 78 of the tail portion 36. In an exemplary embodiment, the distance 68 is within a range of approximately 2.583-2.634centimeters (1.017-1.037 inches), and more particularly may be approximately 2.609 centimeters 1.027 inches). The distance 68 may have another length in other embodiments, as may be suitable for the particular application of the housing 20. From the gradient 106 to the back surface 112 (left to right according to FIG. 10), the opening 114 has a substantially uniform diameter 70 across its substantially uniform cylindrical shape. In an exemplary embodiment, the diameter 70 is within a range of approximately 4.623-4.674 centimeters (1.820-1.840 inches), and more particularly may be approximately 4.648 centimeters (1.830 inches). The diameter 70 may have another length in other embodiments, as may be suitable for the particular application of the housing 20.

Figure 12:
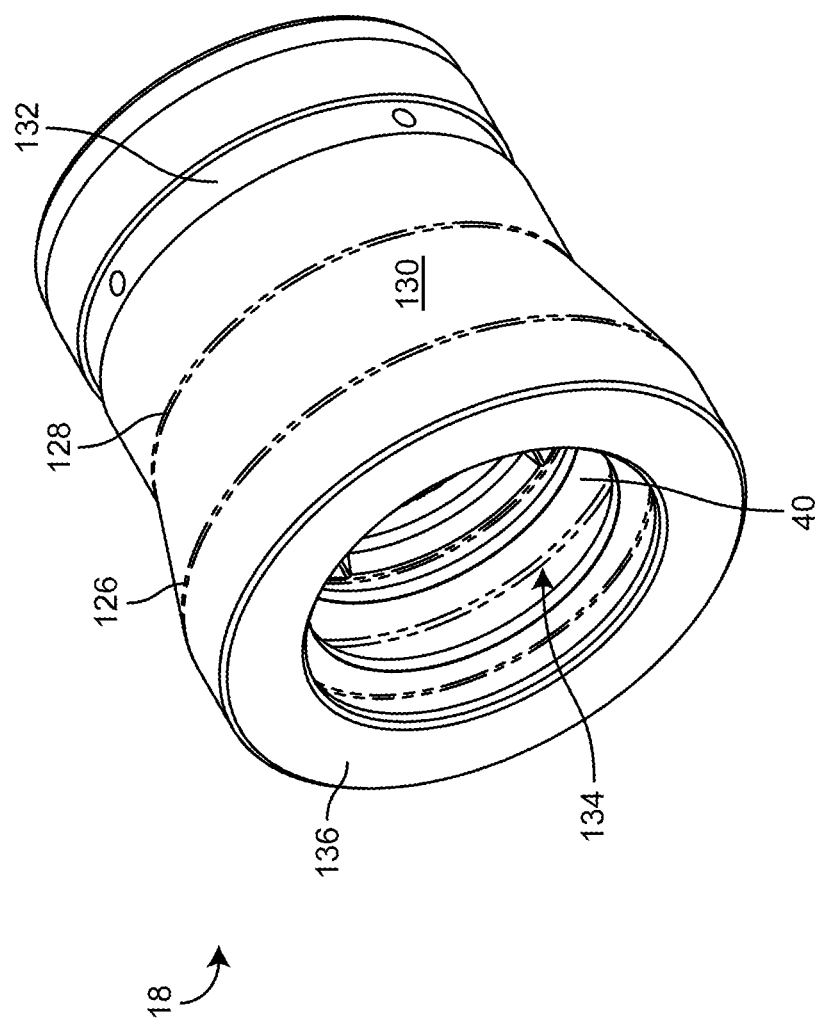
FIG. 12 is a perspective view of a drill shank bearing for the bearing assembly of FIG. 4, according to an exemplary embodiment.
Figure 13:
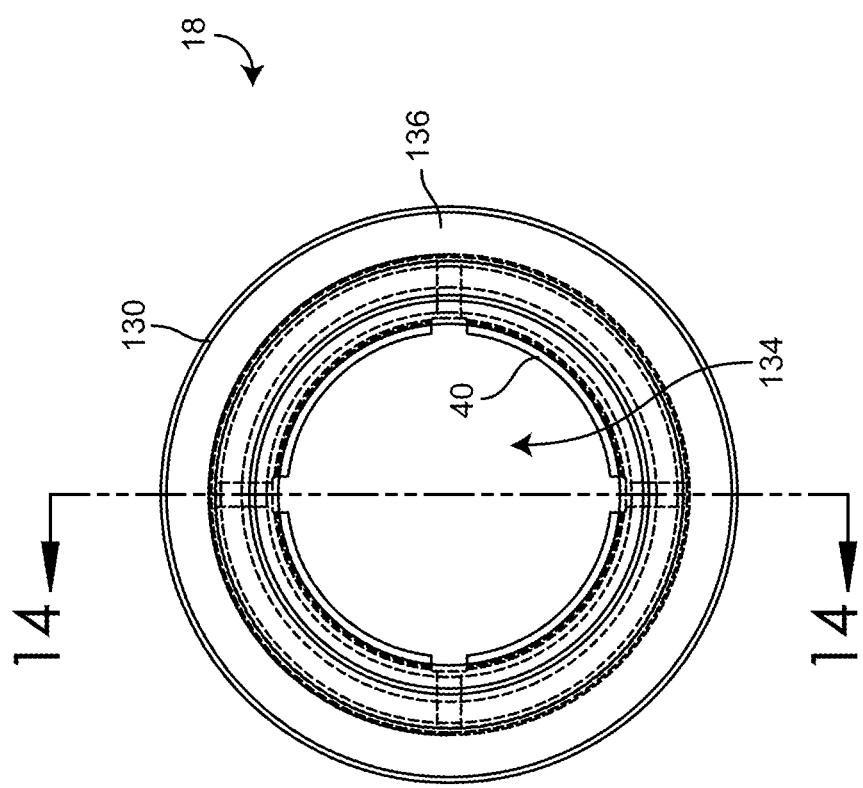
FIG. 13 is a front elevation view of the drill shank bearing of FIG. 12.
Figure 14:
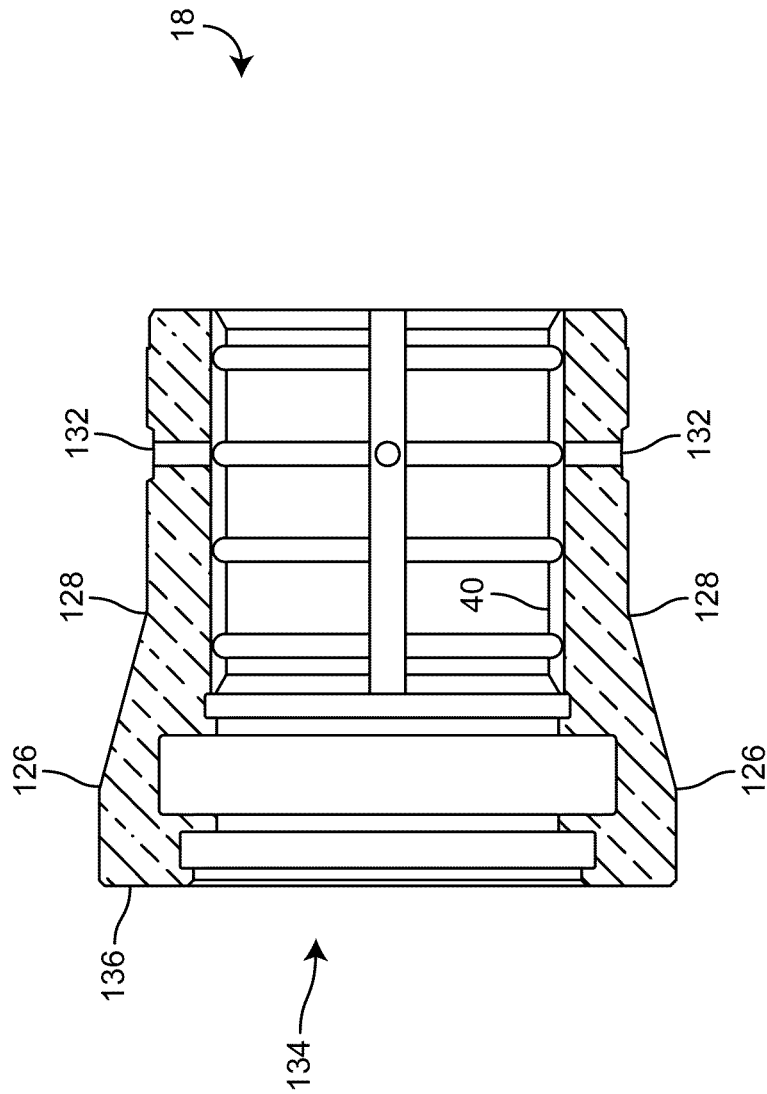
FIG. 14 is a cross-sectional view of the drill shank bearing taken along line 14-14 of FIG. 13.

Referring now to FIGS. 12-14, the shank bearing 18 is shown according to an exemplary embodiment. In this embodiment, the shank bearing 18 is isolated from the housing 20, but the shank bearing 18 is still configured to fit substantially within the housing 20 as part of the bearing assembly 30. In an exemplary embodiment, the shank bearing 18 is at least partially made from an aluminum bronze material. In other embodiments, the shank bearing 18 may be made from another material suitable for the particular application of the shank bearing 18, such as a relatively hard material configured to reduce wear of the shank bearing 18 during the operation of the rock drill 10. The shank bearing 18 includes an opening 134 configured to receive the drill shank 16 and a surface 136 provided around the opening 134. In an exemplary embodiment, the surface 136 provides or forms a substantially circular perimeter around the substantially cylindrical opening 134. In this embodiment, the surface 136 is generally flat and configured to rest substantially parallel with the surface 110 of the housing 20 when the shank bearing 18 is positioned securely within the housing 20. The shank bearing 18 includes an outer surface 130 that may be sized and/or shaped to mate with the housing 20 when the shank bearing 18 is positioned within the housing 20. For instance, the outer surface 130 may include contours or other markings configured to match one or more contours, markings, or specific dimensions of the housing 20. In the illustrated embodiment of FIG. 12, the shank bearing 18 includes contours 126 and 128 positioned on the outer surface 130 and configured to mate with gradients 102 and 104, respectively, on the inner surface 54 of the housing 20. In this embodiment, the shank bearing 18 also includes a groove 132 (i.e., recess, slot, channel) configured to mate with one or more features of the housing 20.

The opening 134 is configured to receive the drill shank 16. In an exemplary embodiment, the inner surface 40 of the shank bearing 18 is sized and shaped to mate with or receive the drill shank 16, such that the drill shank 16 fits securely within the shank bearing 18. When the drill shank 16 is fitted or positioned within the shank bearing 18, the outer surface 130 of the shank bearing 18 is positioned substantially adjacent to the inner surface 54 of the housing 20. In an exemplary embodiment, the shank bearing 18 is fitted around the drill shank 16 such that the shank bearing 18 remains substantially stationary relative to the housing 20, bearing assembly 30, and the rotation housing cover 14 as the drill shank 16 rotates and/or oscillates. The shank bearing 18 may also be configured to constrain or otherwise prevent unwanted movement of the drill shank 16 during the drilling operation. For instance, the shank bearing 18 may be configured to allow the drill shank 16 to rotate and/or oscillate relative to the rock drill 10, but may maintain the motion of the drill shank 16 along one or more desired paths.

The construction and arrangement of the bearing assembly for rock drills, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

INDUSTRIAL APPLICABILITY

The disclosed bearing assembly may be implemented into any machine having a rotatable component with a replaceable bushing or bearing. The disclosed bearing assembly may reduce the damage or wear caused to the bearing assembly by reducing unwanted movement of the bearing assembly during the machine operation. For instance, the disclosed bearing assembly has a multi-sided surface that may prevent an axial rotation of the bearing assembly, reducing the amount of wear to the bearing assembly. The disclosed bearing assembly also includes retaining features that may prevent a lateral or linear motion of the bearing assembly relative to the associated machine, reducing the amount of wear to the bearing assembly due to the lateral or linear motion.

The disclosed bearing assembly may also reduce the amount of downtime associated with a replacement of the bearing assembly. The disclosed bearing assembly is fitted to the machine by retaining pins or rods fitted to retaining features of the bearing assembly, such that the bearing assembly may be removed and/or replaced by removing the retaining pins or rods with simple tools, allowing the bearing assembly to pull away from its housing or another similar component of the associated machine.

It will be apparent to those skilled in the art that various modifications and variations can be made to the disclosed bearing assembly for rock drills. Other embodiments will be apparent to those skilled in the art from consideration of the specification and practice of the disclosed bearing assembly for rock drills. It is intended that the specification and examples be considered as exemplary only, with a true scope being indicated by the following claims and their equivalents.

What is claimed is:

1. A bearing assembly for a rock drill, the bearing assembly comprising:
    a housing, comprising:
        a cylindrical tail portion; and
        a head portion having a multi-sided outer surface configured to inhibit a rotation of the bearing assembly relative to the rock drill, the head portion comprising a plurality of retaining slots formed in the multi-sided outer surface, each retaining slot being configured to mate with a retaining component of the rock drill to inhibit an axial movement of the housing; and
    a bearing positioned within the housing and configured to receive a rotatable component of the rock drill.

2. The bearing assembly of claim 1, wherein the plurality of retaining slots comprise three retaining slots.

3. The bearing assembly of claim 2, wherein the bearing assembly is axially removable from the rock drill by decoupling each of the retaining components from the rock drill.

4. The bearing assembly of claim 1, wherein each retaining component comprises one or more cylindrical retaining rods, and wherein the retaining slots have a rounded shape configured to mate with the one or more cylindrical retaining rods to inhibit the axial movement of the bearing assembly.

5. The bearing assembly of claim 4, wherein the retaining slots have a width corresponding to a diameter of the retaining component.

6. The bearing assembly of claim 1, wherein the multi-sided outer surface comprises three sides and has a substantially tricoloidal shape.

7. The bearing assembly of claim 1, wherein the bearing is configured to fit securely within the housing such that the bearing remains substantially stationary relative to the rotatable component.

8. The bearing assembly of claim 7, wherein the bearing is configured to receive a rotatable drill shank.

9. The bearing assembly of claim 1, wherein each side of the multi-sided outer surface converges with each adjacent side to form a contact point, and wherein each contact includes at least one of the retaining slots.

10. A bearing assembly for a device having a rotatable component, the bearing assembly comprising:
    a housing, comprising:
        a tail portion; and
        a head portion having a tricoloid shaped outer surface configured to inhibit a rotation of the bearing assembly relative to the device, the head portion comprising retaining slots formed between each side of the outer surface, each retaining slot being configured to mate with a retaining component of the device to inhibit an axial movement of the housing; and
    a bearing positioned within the housing and configured to receive the rotatable component.

11. The bearing assembly of claim 10, wherein the plurality of retaining slots comprise three retaining slots.

12. The bearing assembly of claim 10, wherein each retaining component comprises one or more cylindrical retaining rods, and wherein the retaining slots have a rounded shape configured to mate with the one or more cylindrical retaining rods to inhibit the axial movement of the bearing assembly.

13. The bearing assembly of claim 12, wherein the retaining slots have a width corresponding to a diameter of the retaining component.

14. The bearing assembly of claim 10, wherein the housing comprises a tapered bore section and a back stop for receiving the bearing.

15. The bearing assembly of claim 10, wherein the bearing is configured to fit securely within the housing such that the bearing remains substantially stationary relative to the rotatable component.

16. A shank bearing assembly for a rock drill, comprising:
    a shank housing, comprising:
        a cylindrical tail portion; and
        a head portion having a cylindrical opening and a tricoloid shaped outer surface configured to inhibit a rotation of the shank bearing assembly relative to the rock drill, the head portion also comprising three retaining slots, each retaining slot configured to mate with a retaining component of the rock drill to inhibit an axial movement of the shank housing; and
    a shank bearing positioned within the shank housing and configured to receive a rotatable drill shank.

17. The shank bearing assembly of claim 16, wherein the three retaining slots are substantially equally spaced around the tricoloid shaped outer surface, with each of the three retaining slots having walls configured to abut with said retaining component to inhibit the axial movement into or away from the rock drill.

18. The shank bearing assembly of claim 17, wherein the head portion further comprises three contact points, with each of the three contact points positioned adjacent to one of the three retaining slots and configured to abut with one or more surfaces of the rock drill, substantially inhibiting the shank housing from rotating relative to the rock drill.

19. The shank bearing assembly of claim 16, wherein the shank housing comprises a tapered bore section sized and shaped to mate the shank housing with the shank bearing.

* * * * *